Dec. 9, 1952     O. O. BEYMER     2,621,061
PIPE COUPLER WITH LOCK
Filed May 27, 1950
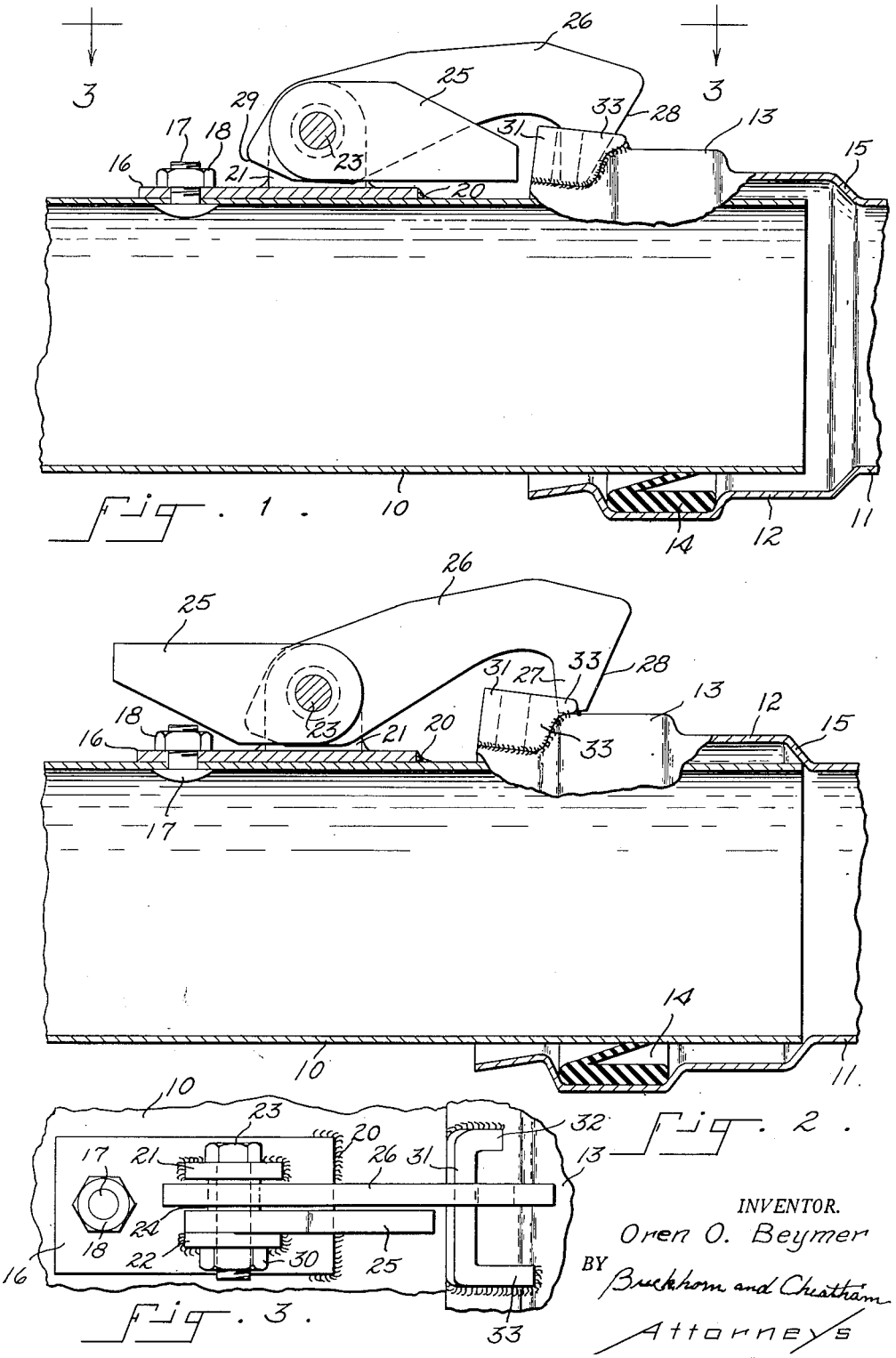

Patented Dec. 9, 1952

2,621,061

UNITED STATES PATENT OFFICE 2,621,061

PIPE COUPLER WITH LOCK

Oren O. Beymer, Eugene, Oreg., assignor to Irrigation Equipment Co., Inc., Eugene, Oreg., a corporation of Oregon Application May 27, 1950, Serial No. 164,781

1 Claim. (Cl. 285—172)

The present invention comprises an improvement in means for coupling two relatively telescoped conduit members such as a pipe and a coupling sleeve together in alignment with each other, the coupling means comprising a latch and a catch so arranged as to interlock with each other, and including means whereby relative rotation of the members in one direction is prevented, while relative rotation of the members in the other direction is permitted under certain conditions as will appear.

The object of the present invention is to provide means whereby a single person may interlock a long series of pipe lengths without having the previously coupled pipe lengths become separated or without causing the previously coupled pipe lengths to rotate beyond a certain position relative to the ground. The invention is of particular importance in the field of transportable irrigation conduits upon which are mounted upright sprinkler heads or the like at spaced intervals, prior devices of this nature being objectionable in that relative rotation of the previously coupled pipe lengths sometimes resulted from manipulation of a coupling at the far end of the series, thus causing the upright sprinkler head standards to fall to the ground and permitting separation of the pipe lengths.

A further object and advantage of the present invention is that rapid uncoupling of pipe lengths may be effected in two different manners, but, if desired, the pipe lengths may be locked in coupled relation so that a tool must be employed to permit separation thereof at intermediate points, thus preventing accidental separation as by mischievous trespassers or cattle or other animals.

Further objects and advantages of the present invention will be apparent from inspection of the accompanying drawing wherein like numerals refer to like parts throughout.

In the drawing, Fig. 1 is a broken away view taken substantially along the centerline of a joint between two telescoped conduit members such as a pipe and a coupling sleeve or a pipe and a second length of pipe having a belled end, the view illustrating the latch in effective latching position and the lock in effective locking position;

Fig. 2 is a view similar to Fig. 1 showing the lock moved to an inoperative position and the latch in a position whereby uncoupling of the coupled members may result from partial relative rotation thereof; and Fig. 3 is a partial plan view taken substantially from the plane of line 3—3 in Fig. 1.

In the present illustration a pipe length 10 is shown as one of a pair of telescoped members, the other member 11 having a belled end 12 for reception of the open end of the pipe 10. The belled end 12 is preferably provided with an annular enlargement 13 providing an inwardly facing groove in which is seated a flexible sealing gasket 14 of any suitable construction such as illustrated whereby pressure of fluid being transported through the conduit will cause a portion of the gasket to become firmly sealed against the inserted pipe length 10. The annular shoulder 15 defining the inner end of the belled portion 12 provides limit means to limit relative insertion of the pipe 10 as illustrated in Fig. 2.

A mounting pad 16 is fixed to the surface of the pipe 10 as by means of a locating bolt 17 passed through drilled openings in the pipe and the pad and tightened in relatively leakproof relation by an external nut 18. There may be any other suitable means such as the welded bead 20 at the forward end of the pad whereby the pad is maintained in definitely fixed position upon the surface of the pipe. A pair of laterally spaced ears 21 and 22 rise from the surface of the pad, the ears being apertured to permit insertion of a pivot bolt 23 extending transversely of the longitudinal axis of the pipe at an elevation above the surface of the pad. A spacer collar 24 surrounds a portion of the bolt between the ears 21 and 22 with one end thereof against the ear 21 and the opposite end thereof against the surface of a pivoted locking member 25 pivotally mounted on the bolt and having its opposite surface bearing against the inner surface of the ear 22. A latch 26 is pivotally mounted on the spacer collar 24 and extends forwardly toward the open end of the pipe 10, the latch being provided with a downwardly facing hook 27 having an inclined forward surface 28. An abutment 29 is provided on the rear end of the latch 26 which is engageable with the surface of the pad 16 to prevent rotation of the latch beyond the vertical whereby the latch will always remain in forwardly extending relation. The locking member 25 may normally rotate from between a forwardly extending position as seen in Figs. 1 and 3 to a reversed rearwardly extending position as seen in Fig. 2. A nut 30 threadedly engaging the protruding threaded end of the bolt 23 may be tightened to clamp the locking member in either position, the nut being tightened usually to hold the locking member in forwardly extending position as seen in Figs. 1 and 3.

A catch 31 is mounted upon the end of the member 11, the catch defining a notch facing away from the open end of the member and the sides of the notch being of different lengths. The catch preferably comprises a short length of strap having portions thereof welded to the external surface of the member, the notch being defined by a short arm 32 and a long arm 33. The forward surface of the catch 31 is preferably inclined away from the open end of the member 11 so that the combined inclinations of the surface 28 and the opposed surface of the catch 31 cause the latch automatically to be raised and dropped into the notch defined by the catch when the members are telescoped together. However, it is sufficient, as will appear, that the catch be provided with the inclined or cam face 28 whereby it will be lifted over the end edge of the belled portion 12.

The arrangement is such that when the members 10 and 11 are telescoped together to a limit relation as determined by member 10 striking the shoulder 15, the tip of the latch will have passed beyond the end of the short arm 32 but not beyond the long arm 33 of the catch. Thus if the members are telescoped with the latch 26 to the left of the catch when looking toward the catch and then relatively rotated to bring the latch into alignment with the catch, latched relation thereof will be assured since the latch cannot rotate beyond the long arm 33. When the members are then relatively separated to the extent illustrated in Fig. 1, they may be locked in position by swinging the lock 25 forward to position its tip adjacent the surface of the catch 31. The members cannot be separated now unless the latch 26 is manually raised to elevate the hook 27 above the catch 31, or unless the locking member 25 is returned to its inoperative position. As previously stated, the locking member 25 may be clamped in locking position by tightening the nut 30 after which separation can be effected only by manually raising the latch 26. An advantage of having the long arm 33 is that an entire series of pipe sections may be connected together by inserting each end into a previously positioned bell mouth and partially rotating the section of pipe. Since all sections are rotated in the same direction and may be locked in latched relation, it would be relatively impossible for accidental reverse rotation to upset some of the standard sprinkler heads.

Having illustrated and described a preferred embodiment of the invention, I claim as my invention all modifications which come within the scope of the appended claim.

I claim:

Means for interlocking two telescoped conduit members such as a pipe and a coupling sleeve comprising a latch, pivot means comprising a pair of apertured ears mounted on the external surface of one of said members, a bolt extending through said ears, and a spacer collar surrounding a portion of said bolt between said ears and pivotally supporting said latch, said latch having a hooked end extending toward the open end of the member upon which it is mounted with the hook thereof facing the surface of the member, a catch fixed to the outer surface of the other of said members and defining a notch facing away from the open end thereof, one of the sides of said notch being longer than the other, means on said members to limit telescoping movement thereof to the extent that said hooked end may project beyond the short side of said notch but not beyond the long side of said notch whereby uncoupling of said members may be effected by telescoping one into the other to a limited extent followed by relative rotation thereof in the direction to cause said hooked end to pass around the end of the short side of said notch, and a locking member pivotally mounted on said bolt adjacent said latch and movable about its pivotal axis from an inoperative position to an operative position extending forwardly alongside of said latch, said locking member being engageable with a portion of said other member to prevent telescoping movement of said members to said limited relationship, said locking member snugly fitting between an end of said collar and the inner surface of one of said ears and the other end of said collar bearing against the inner surface of the other of said ears whereby tightening of said bolt causes said ears and spacer collar to clamp said locking member in pivotally adjusted position while permitting free pivotal member of said latch.

OREN O. BEYMER.

REFERENCES CITED

The following references are of record in the file of this patent:

UNITED STATES PATENTS

| Number | Name | Date |
| --- | --- | --- |
| 2,144,834 | Di Cesare | Jan. 24, 1939 |
| 2,253,232 | Gheen | Aug. 19, 1941 |
| 2,464,466 | Stout | Mar. 15, 1949 |
| 2,499,476 | Eyerly | Mar. 7, 1950 |